Figure 6:
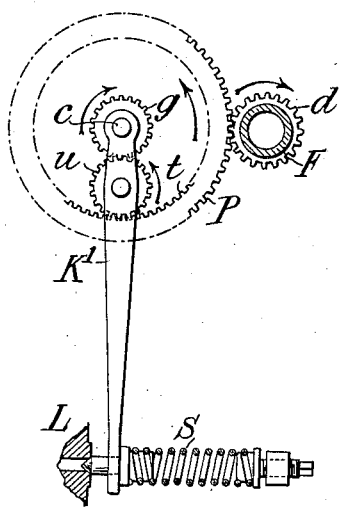

F. M. LEAVITT.
ENGINE GOVERNOR.
APPLICATION FILED APR. 5, 1912.
1,088,079.
Patented Feb. 24, 1914.
2 SHEETS—SHEET 1.
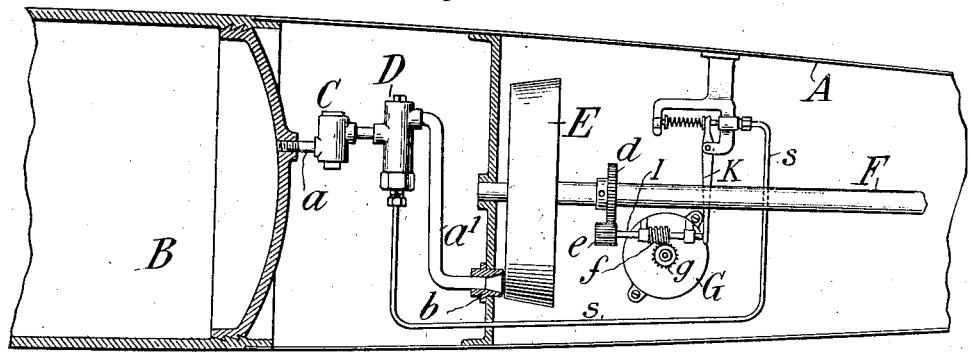
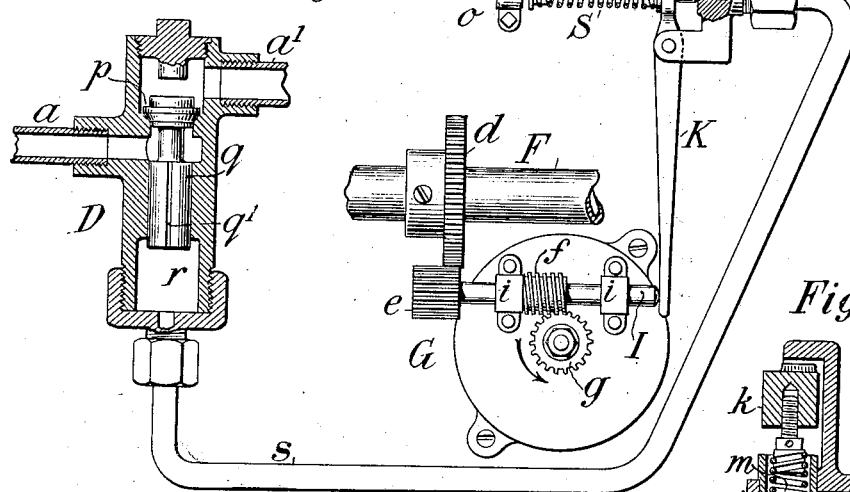
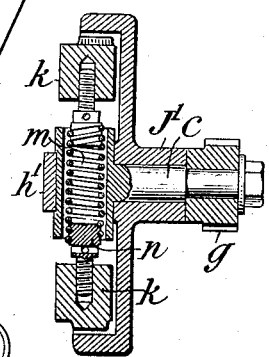
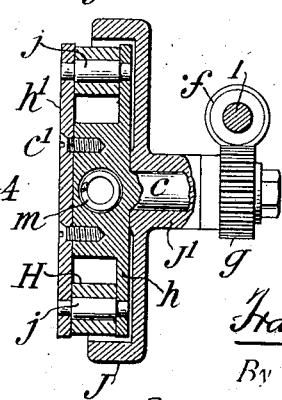
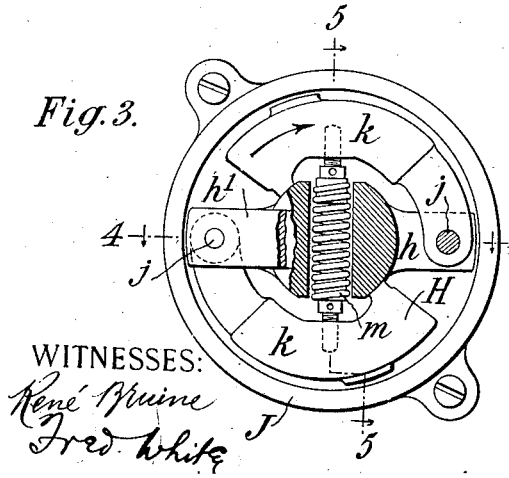
INVENTOR
Frank M. Leavitt,
By Attorneys,

F. M. LEAVITT.
ENGINE GOVERNOR.
APPLICATION FILED APR. 5, 1912.

1,088,079.

Patented Feb. 24, 1914.
2 SHEETS—SHEET 2.

WITNESSES:

INVENTOR:
Frank M. Leavitt,
By Attorneys,

UNITED STATES PATENT OFFICE.

FRANK M. LEAVITT, OF SMITHTOWN, NEW YORK, ASSIGNOR TO E. W. BLISS COMPANY, OF BROOKLYN, NEW YORK, A CORPORATION OF WEST VIRGINIA.

ENGINE-GOVERNOR.

1,088,079.

Specification of Letters Patent.   Patented Feb. 24, 1914.

Application filed April 5, 1912.   Serial No. 688,579.

*To all whom it may concern:*

Be it known that I, FRANK M. LEAVITT, a citizen of the United States, residing in Smithtown, in the county of Suffolk and State of New York, have invented certain new and useful Improvements in Engine-Governors, of which the following is a specification.

This invention provides a governor for controlling the speed of an engine or other motor.

Although designed specially for use in automobile torpedoes, the invention may, with appropriate structural modifications, be applied for governing engines or motors used for other purposes.

In an automobile torpedo propelled by a turbine or other form of engine driven by compressed air, difficulty has heretofore been found in providing means for suitably governing the speed of the engine. The engine operates at such high speed and develops so considerable a power for so brief a time, that the problem of governing its speed has been considered well nigh insuperable. The difficulty of the problem is greatly increased by the necessity for extreme compactness and the prohibition against increasing materially the weight of the torpedo, so that the governor must necessarily be both very small and very light, while at the same time extremely sensitive and capable of controlling instantly the speed of the very small but high-powered engine. It is highly desirable also that the governor should be capable of regulating the acceleration of the engine in speeding up, whereas governors of the ordinary centrifugal type exert no control until the prescribed speed is attained.

The difficulties of the problem have heretofore frustrated any attempt to provide a speed governor for automobile torpedoes, designers of such torpedoes having contented themselves with the introduction of means for throttling the fluid pressure for a short time during or after launching to provide against the racing of the engine before the torpedo enters the water; and means for cutting off permanently the supply of fluid pressure in case, after entering the water, the torpedo engine should race by reason of the torpedo, through some derangement of the diving gear, leaping out of the water, or because of any other accident that occasions an undue speed.

The present invention provides a governor which first controls, by its inertia, the speeding-up of the engine so that the latter is so restrained that its acceleration is reduced to a certain prescribed rate and which, after the attainment of full speed, acts as a centrifugal governor of extreme sensitiveness. Its centrifugal element acts by introducing a frictional load upon the governor whenever the speed exceeds that determined by its adjustment. The centrifugal member is driven from the engine shaft through the medium of gearing, which includes a movable member which suffers displacement according to variations in the resistance afforded by the rotary or centrifugal element of the governor. This movable or "floating" member of the gearing thus responds very sensitively to any variation in the resistance or drag afforded by the rotary member or weight. Its movement is utilized to operate the speed-controlling means which in an ordinary engine would be the throttle valve, but in a torpedo is replaced by a more sensitive valve which in turn controls either a throttle, or preferably, a reducing valve by which the compressed air is dropped from the high pressure in the reservoir to the lower pressure at which the air is fed to the engine.

The accompanying drawings show the preferred form of my invention as applied to an automobile torpedo.

Figure 7:
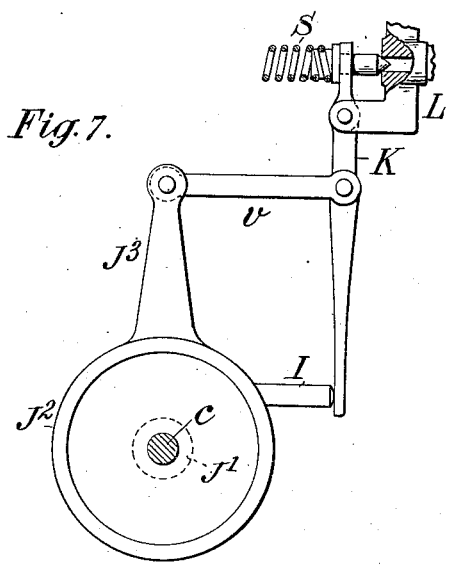

Figure 1 is a fragmentary, vertical, longitudinal section of the torpedo showing the governing mechanism in elevation. Fig. 2 is a similar view of the governing mechanism on a larger scale, the valves being shown in section. Fig. 3 is an elevation partly in section of the centrifugal element upon a larger scale. Fig. 4 is a vertical transverse section of the part shown in Fig. 3, on the plane of the line 4—4 therein. Fig. 5 is a similar section on the plane of the line 5—5 in Fig. 3. Figs. 6 and 7 are sectional elevations illustrating modifications.

Referring to Fig. 1, A is the shell or hull of the torpedo, B the compressed air flask or reservoir, C the starting valve, D the reducing valve, a a' the pipe leading through these valves to the inlet or nozzle *b* of the engine, E the engine, shown as a turbine, and F the propeller shaft. All of these parts may be of the well known construction and require no description.

G is the governor. In the construction shown this comprises a revolving inertia and centrifugal element H which I will call the "rotor," mounted on a shaft *c* which is driven through suitable gearing from the shaft F or otherwise from the engine, this gearing being so devised as to introduce a movable member or floating part which moves in response to the resistance afforded by the rotor H. The gearing shown comprises a gear-wheel *d* on the shaft F driving a pinion *e* on a shaft I, which shaft carries a worm *f* meshing with a worm wheel or pinion *g* on the rotor shaft *c*. The worm shaft I is free to slide longitudinally in its bearings *i i* and constitutes the movable or floating element of the gearing.

The rotor H comprises a head or carrier *h* carried by the shaft *c*, and centrifugal weights *k k* connected in any convenient way to said carrier so as to be forced to rotate therewith, while being free to move outwardly under centrifugal force, being drawn inwardly by the stress of any suitable form of spring *m*. In the construction shown the weights *k k* are mounted on lever arms turning on pivots *j j* connected to the carrier *h*, a cross-bar *h'* being extended between these pivots and fastened to a boss or hub *c'* formed integrally with the shaft *c* and head *h*. The rotor turns within a stationary curb J, formed as a ring or flange, which is conveniently made in one piece with the bearing J' in which the shaft *c* turns. The stress of the spring *m*, which draws the weights *k k* inwardly, may be adjusted in any suitable manner so as to determine the prescribed speed of the engine. The adjustment shown consists of heads *n n* fastened to the opposite ends of the spring and having screw shanks engaging threaded holes in the weights *k*, or any other adjusting means may be provided. The spring *m* shown is a helical spring stretched between the weights and passing freely through a diametrical bore or opening formed through the hub *c'*. The spring draws the weights in to a seating against this hub until its stress is overcome by the centrifugal force, which throws the weights outwardly into frictional contact with the curbing J.

The movable shaft I receives the pressure of a spring S tending to thrust it toward its normal or starting position shown in Fig. 2. This stress is conveniently communicated to it through a lever K. This lever is also utilized to communicate the motion of the shaft I to the controlling valve L, which valve also receives the pressure of the spring S, tending to close it. The stress of this spring is adjusted in any suitable way, as, for example, by means of a screw *o*. The valve L is shown as a bleeder valve controlling the operation of the pressure-reducing valve D. This reducing valve, in the construction shown, is a substantially balanced valve, its tappet or valve proper *p* being formed on the same stem with a plunger *q* of substantially similar area, so that the high pressure air admitted through pipe *a* acts oppositely upon them so that the valve is nearly or quite balanced. The plunger *q* moves in a cylindrical cavity communicating with a chamber *r*, which is vented to the outer air through a tube *s* controlled by the bleeder valve L. A slight leakage is afforded either around the plunger *q* or, for example, through a groove *q'* formed in the plunger, or by any other suitable duct, whereby a minute flow of air is admitted into the chamber *r*. If the bleeder valve be closed, this leakage will soon establish a pressure in chamber *r*, overbalancing the back pressure in the outlet pipe *a'*, and hence lifting the plunger and opening the valve; the pressure admitted to the outlet pipe *a'* tends to close the valve, while the pressure in *r* can escape through the bleeder valve when it becomes sufficient to unseat the latter against the stress of its spring S. Consequently the adjustment of this spring determines the pressure on the outlet side of the reducing valve D. The escape of air through the bleeder valve reduces the pressure in *r* and enables any preponderance of pressure in *a'* to close the valve *p*. This valve is consequently controlled by the bleeder valve according to the adjustment of the spring S, and by the action of the governor as will now be described.

Upon the launching of the torpedo the starting valve C is opened automatically in a manner well understood, thereby admitting pressure to the reducing valve D. The valve L being closed, the leakage into the chamber *r* quickly opens the reducing valve and permits a flow of air under reduced pressure to the engine. In launching from above the water level the torpedo propellers receive only the resistance of the air and hence the engine tends to race. As the engine starts it tends to start the governor, but as the rotor H, by its inertia, resists rotation, the accelerating rotation of the engine causes the worm *f* to turn faster than the pinion *g*, so that it screws the shaft I toward the right in Fig. 2, thus communicating motion through the lever K to open the valve L. This causes air to escape and reduces the pressure in chamber *r*, and hence closes partially the valve D, throttling the supply of air to the engine and checking the speed of the latter. Thus the tendency of the engine to race under light load or to accelerate too rapidly is resisted by the inertia of the rotor H. As this rotor gradually accelerates under the driving torque its resistance to the driving effort diminishes and consequently the stress of the spring S becomes effective to restore the shaft I to or toward its initial position, thereby closing partly or entirely the valve L and hence increasing the pressure in chamber r and opening wider the valve D, thereby supplying more air to the engine and permitting the latter to accelerate until it reaches the normal speed. Thus far the governor has acted solely by inertia, no centrifugal action having occurred.

As soon as the normal speed is attained the centrifugal tendency of the weights k balances the pull of the spring m and the weights revolve in equilibrium, not necessarily touching either the boss c' or the frictional curb J. But the instant the speed exceeds the normal, the weights move outwardly and bear more or less strongly against this curb so that, as they swing around, they rub against the stationary curb and generate a frictional retardation or drag proportioned to their outward pressure. This drag resists the rotation of the rotor and consequently slows it down relatively to the driving shaft. Or, in other words, it increases the power required to drive the rotor. This increased power is, so to speak, measured by the floating shaft I which acts as a sort of dynamometer. The effect is analogous to that originally produced by the inertia of the rotor, that is, the worm f travels faster than the retarded gear g and consequently screws the shaft I toward the right, which, acting through the lever, opens the valve L and permits an escape of pressure from the chamber r, thus imparting a closing movement to the valve D and diminishing the air supplied to the engine until the latter is reduced to the normal speed. As the speed diminishes the drag offered by the rotor H diminishes and consequently the stress of the spring S becomes effective to restore the floating shaft I gradually to its normal position. In this position the shaft I is somewhere between its extreme positions and the valve L is partially open so that the escape of air through this valve occurs at such rate as to keep the pressure in the chamber r down sufficiently to cause the movable element of the reducing valve to remain in equilibrium, its valve proper being open only sufficiently to discharge that volume of air required to keep the engine at normal speed. This condition will, of course, vary according to the work done by the engine, the throttling occasioned being greater as the load carried by the engine is lighter.

In ordinary centrifugal governors the outward movement of the weights under centrifugal force acts through some suitable intervening part to communicate movement to the throttle valve. This requires a governor of considerable size with weights of considerable mass. The size and weight required would render such a governor inapplicable within the limitations of an automobile torpedo. With my invention, however, the sole function of the weights is to establish a frictional drag against the stationary flange or curb J, which requires only a minute movement and permits the use of small light weights revolving rapidly in a circle of relatively small radius, thus making the governor both very small and very light. It is extremely sensitive because the floating shaft I is practically frictionless in its response to the varying drag of the rotor, due to the fact that its bearing friction is overcome by its rotative movement, so that its longitudinal movement responds with extreme sensitiveness to the varying ratio of the drag or resistance of the rotor H and the counter-pressure derived from the spring S.

Under actual test, when subjected to varying conditions, such as those to which the engine of an automobile torpedo is subjected, this governor is found to restrain the engine to a gradual acceleration until full speed is attained, after which the speed is maintained so nearly constant that no fluctuation is apparent in the tracing given by a recording tachometer, the actual fluctuation being probably well within one per cent.

My invention is not limited to the specific embodiment thus shown and described, but may be greatly varied in its mechanical details and mode of application, provided the principle introduced by my invention is availed of.

My invention is not limited to the control of the engine through the medium of the pressure-reducing valve, although this is a very desirable means in an automobile torpedo where compactness is important, since it enables one valve to perform the two functions of reducing the compressed air to the practically uniform pressure required at the engine, and also of further throttling this air to govern the speed of the engine. Nor is my invention confined to the particular type of reducing or throttling valve shown, nor to this valve being operated through the medium of a controlling or bleeder valve, such as the valve L.

While the use of a worm shaft as the floating or dynamometrical element of the driving gear is preferable, yet any other type of gearing which comprises a movable element which may respond to the varying drag of the rotor, could be substituted.

As an example of one of the modifications of which my invention is susceptible reference is made to Fig. 6, where F is the engine or propeller shaft with its pinion d, which latter drives a gear-wheel P having internal gear teeth $t$ which, through a pinion $u$, drives the pinion $g$ on the shaft $c$. This shaft $c$ may carry the same rotor as illustrated in Figs. 3, 4 and 5. The pinion $u$ is movable around the axis $c$, being hung on a lever K' which serves the same function as the lever K previously described, its long arm engaging the valve L and receiving the stress of the spring S. The driving torque applied to the wheel P tends to cause the pinion $u$ to travel as a planet gear around the pinion $g$, this tendency being effective in proportion to the inertia or frictional retardation of the rotor. The pinion $u$ thus becomes the floating or dynamometrical element of the gearing. The effect communicated through the lever K' to the valve L is the same as in the construction first described.

The movements of the movable element or floating part of the gearing may be variously utilized to actuate any suitable type of speed-controlling means. Such means, in a fluid pressure-driven engine, are best applied to control the fluid pressure or fluid supply through some suitable valve arrangement; but other speed-controlling means may be provided, the character of which will depend upon the type of motor to be governed.

Although preferably the centrifugal brake acts against a fixed part J, yet it is not essential that this part be fixed as it might be movable as the result of the frictional brake. An example of this is shown in Fig. 7, where the frictional curb J² is pivotally mounted on the outside of the bearing sleeve J' and carries an arm J³ which, through a link $v$ connects with the lever K to such effect that when the weights fly out and bear against the curb J², their drag moves the latter rotatively in an effort to follow them so that the arm J³ communicates a push through the rod $v$ tending to open the valve L and reduce the speed of the engine.

I claim as my invention:—

1. In an automobile torpedo a governor comprising a driving part, a rotor driven therefrom, interposed gearing including a member movable with variations in the resistance offered by said rotor, and speed-controlling means operated by the movements of said movable member.

2. In an automobile torpedo a governor comprising a driving part, a rotor driven therefrom including a weight movable outward to form a centrifugal brake, a stationary part rubbed by said brake, and gearing between said driving part and rotor including a member movable with variations in the resistance offered by said rotor, and speed-controlling means operated by the movements of said movable member.

3. In an automobile torpedo a governor comprising a driving part, a rotor driven therefrom including a weight movable outward to form a centrifugal brake, a part engaged by said brake, a speed-controlling means, and means actuated by the resistance imposed by said brake to operate said speed-controlling means.

4. In an automobile torpedo a governor comprising a driving part, a rotor driven therefrom, interposed gearing including a longitudinally movable worm shaft, and speed-controlling means operated by the movements of said worm shaft.

5. In an automobile torpedo a governor comprising a driving part, a rotor driven therefrom, including a weight movable outward under centrifugal force, an adjustable spring drawing said weight inward, a stationary part rubbed by said weight when thrown outward, and gearing between said driving part and rotor, including a member movable with variations in the resistance offered by said rotor.

6. In an automobile torpedo a governor comprising a driving part, a rotor driven therefrom including opposite weights movable outward under centrifugal force, an adjustable spring drawing said weights inwardly, a stationary part rubbed by said weights when thrown outward, and speed-controlling means operated in proportion to the variable resistance of such frictional contact.

7. In an automobile torpedo a governor comprising a driving part, a rotor driven therefrom, interposed gearing including a member movable with variations in the resistance offered by said rotor, an adjustable spring opposing movements of such movable member, and speed-controlling means operated by such movements.

8. In an automobile torpedo a governor comprising a driving part, a rotor driven therefrom, interposed gearing including a member movable with variations in the resistance offered by said rotor, and a speed-controlling valve operated by the movements of said movable member.

9. In an automobile torpedo a governor comprising a driving part, a rotor driven therefrom, interposed gearing including a member movable with variations in the resistance offered by said rotor, and speed-controlling means including a bleeder valve operated by the movements of said movable member.

10. In an automobile torpedo a governor comprising a driving part, a rotor driven therefrom, interposed gearing including a member movable with variations in the resistance offered by said rotor, and speed-controlling means comprising a main valve controlled by an auxiliary valve, and the latter operated by the movements of said movable member.

11. In an automobile torpedo the combination with an engine, of a pressure-reducing valve in the fluid supply passage leading to such engine, and a governor comprising a rotor driven from said engine, interposed gearing including a member movable with variations in the resistance offered by said rotor, and means for operating said reducing valve controlled by the movements of said movable member.

12. In an automobile torpedo, the combination of a source of compressed fluid, an engine, an interposed fluid passage, a reducing valve in said passage, and a governor comprising a rotor driven from said engine, interposed gearing including a member movable with variations in the resistance offered by said rotor, and means operated by the movements of said movable member for controlling said reducing valve.

In witness whereof, I have hereunto signed my name in the presence of two subscribing witnesses.

FRANK M. LEAVITT.

Witnesses:
  H. C. SEAMAN,
  JOHN D. MCINTYRE.